July 2, 1935. C. H. BREERWOOD 2,006,939
MANUFACTURE OF CEMENT
Filed June 5, 1934 2 Sheets-Sheet 2
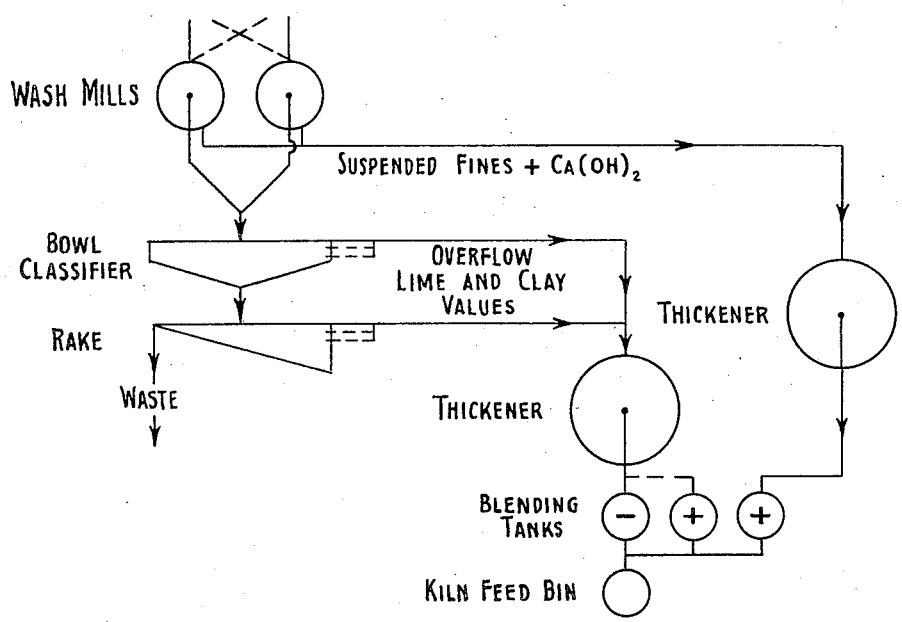
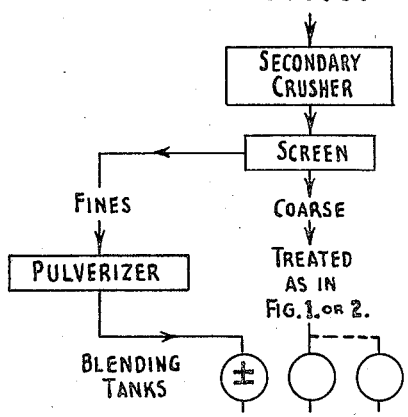
INVENTOR
C. H. BREERWOOD.
BY
ATTORNEYS Patented July 2, 1935

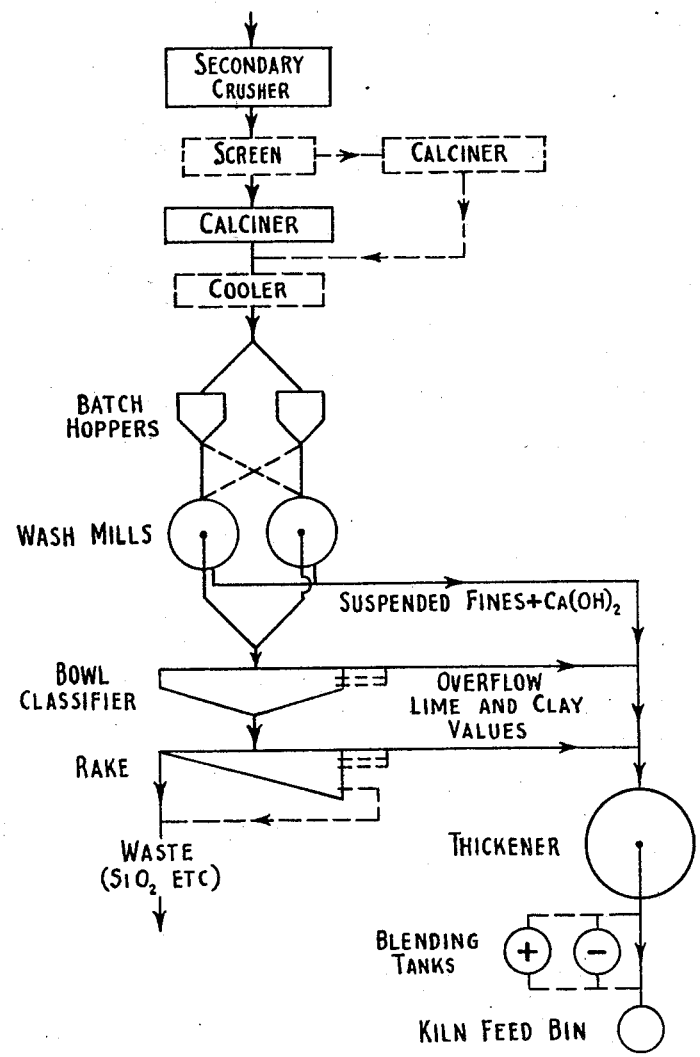

2,006,939

UNITED STATES PATENT OFFICE 2,006,939

MANUFACTURE OF CEMENT

Charles H. Breerwood, Narberth, Pa., assignor to Valley Forge Cement Company, a corporation of Pennsylvania Application June 5, 1934, Serial No. 729,099

16 Claims. (Cl. 106—25)

This invention relates to the manufacture of Portland cement, its modifications and special cements, in which compounds of calcium and silica are the principal constituents. More particularly it is concerned with the preliminary treatment of available inferior argillaceous limestones, to derive therefrom ultimate mixtures of predetermined analysis. These mixtures are prepared without resorting to the expense and usually incompletely effective prior practice of adding correctives, such as limestone, to improve the composition. The new method makes it possible for the chemist to segregate the principal constituents of a cement raw material mixture from an inferior original rock, and to combine them in the desired proportions and ratios. It is a further purpose to discard excessive quantities of certain constituents and to eliminate entirely uncombinable forms of silica, particularly coarse quartz, and quantities of certain undesirable compounds or foreign materials occurring in the natural rock. The products of the new method are both physically and chemically especially suitable for burning to cement clinker, and are prepared at lower cost than those reduced and compounded by conventional practice.

The new method is especially applicable to the treatment of inferior argillaceous limestones or cement rocks, which may be classified for purposes of the present invention into two general types. The first of these includes those rocks which have heretofore been employed as the principal component of a Portland cement mixture, compounded with the necessary quantity of a corrective, as by adding limestone when the original rock is deficient in calcium. The second type includes those rocks which, owing to their composition, cannot be corrected to produce a cement of the type desired by combination with one or more correctives.

These inferior argillaceous limestones occur in great profusion and typical examples are found in the Lehigh Valley district. These rocks contain the essential constituents calcium, silica, alumina and iron, but the relative proportions and the physical condition vary widely, even in the same quarry. Most of it is deficient in calcium carbonate, excessive in silica, including uncombinable forms, excessive in alumina particularly with respect to the newer types of Portland cement, such as Boulder Dam specification cement, and satisfactory with respect to iron. Almost invariably a part of the silica occurs as quartz, all of which is not reduced by ordinary methods of grinding to particle sizes which will react favorably with the calcium during the process of burning to clinker. The alumina apparently occurs solely as silicates of alumina, principally micaseous. These compounds of silica and alumina are usable forms of both of these essential constituents, but where the total alumina present exceeds that desired for the final mixture, as is almost invariably the case when it is desired to produce low alumina or Boulder Dam type cement, the addition of high grade limestone as a corrective of the lime or hydraulic modulus does not reduce the relative proportion of alumina sufficiently to correct the silica modulus. Further, these combined forms make it impossible to obtain complete correction by the addition of other normal correctives, including iron compounds.

Rock of generally similar composition, but containing magnesia in proportions slightly above the permissible limit also occurs in this and other districts. Heretofore, all of this stone has been considered useless, as no commercial method was known for decreasing the magnesia content. The present method permits a partial elimination, in some cases up to approximately one-half of the total magnesia content, and accordingly also makes available for cement manufacture vast quantities of rock of this composition.

In my Patent No. 1,931,921, I have explained in detail the manufacturing and chemical difficulties resulting from the presence of coarse quartz in a final mixture of correct chemical analysis. The terms "coarse quartz" are intended to mean those particles which, although relatively fine, are inseparable by known methods from the preliminary or ultimate mixture, but nevertheless too coarse for favorable combination with calcium at reasonable kiln temperatures. It is my opinion that particle sizes too large to pass a 325 mesh sieve should be eliminated from the mixture to produce the best results, and when the total available silica permits further elimination, better reactions are obtained by discarding even finer particles. In view of its relative hardness, no economical method exists for reducing all the coarse quartz to combinable sizes, and accordingly it has been necessary to burn the mixture at high temperatures with excessive coal consumption. The presence of uncombined quartz in the clinker makes the latter difficult to grind. As a result of the variable quantity of uncombinable silica and the uncertainty in the reactions in burning, present commercial cements are variable both in quality and strength, and do not reach the expected theoretical maximum strengths.

The present invention enables the cement chemist to segregate the lime from the clay compounds, and further to segregate the coarse silica from these argillaceous materials. This permits him to discard excessive quantities of combinable silica with the coarse quartz and likewise enables him to control the proportion of alumina within the desired limits; that is, it enables him to exercise the closest control of the desired final mixture, both as to proportions and ratios. Expressed in another way, the cement is produced substantially by synthesis, in that the ultimate mixture is combinable almost on a molecular basis.

Due to the elimination of the uncombinable or coarse silica, the reaction in burning the mixture to clinker is not only certain, but is also complete, whereby the ultimate quality of the cement can be predicted with accuracy. The calcium content of a mixture may therefore be increased safely beyond the present practical limits to produce sound cement of exceptional early and ultimate strength characteristics, with lime saturation approaching the maximum theoretical upper limit. Likewise, the relation and total quantities of alumina and iron are so controllable that the tri-calcium aluminate content of the cement may be kept within the desired limits, either for purposes of producing high early strength cements or low tri-calcium aluminate cements.

Although the most important advantage of the new method will appear to be the elimination of the enormous cost of adding correctives to inferior stones, or the utilization of rock heretofore considered practically worthless, the flexibility of the new method whereby a single inferior argillaceous limestone may be used as the source of mixtures for the production of various types of cements of the highest quality is one of its greatest advantages.

The new method makes it possible for the chemist to produce many types of cement economically in many areas where the natural composition of the rock is such that the desired mixtures cannot be obtained or corrected by methods known heretofore with the exception of that disclosed in my patent above mentioned.

Another important economical advantage of the new method has to do with simplified quarry practice, whereby the rock can be removed with less care in selection, and reduced to especially suitable sizes for burning without grinding, as in present practice. Further, the calcium carbonate is converted to calcium hydrate, a form in which it can be employed if desired as a high lime corrective, and in which it combines readily due to its physical and chemical state.

In general, the new method comprises crushing the raw rock preferably to normal secondary crusher sizes with a minimum of fines, all of the product being preferably as nearly uniform in size as possible. As will be explained more particularly hereinafter, the particle sizes should preferably be 1 inch ring or less, in order to provide for uniform calcination to avoid uneconomical waste of the usable constituents.

This crushed product is then calcined to a degree sufficient to obtain a substantially complete ignition loss, but without heating the rock for a sufficient length of time and at a temperature which will cause material reactions between the calcium, silica and to some extent alumina, and especially to avoid these reactions in the presence of water. As will appear more in detail hereinafter, this step is slightly critical, owing to the presence of combinable silica, which is made more reactive by the heating process, and should not be confused with the calcination of high grade limestones, for the purpose of producing caustic lime.

This calcined rock, preferably at the highest temperature that will permit satisfactory mechanical handling, is then submerged preferably by batches, to permit continuous operation, in an excess of water, approximately 10 to 15 times the volume of the dry solids. The quantity of water is not critical, although a deficiency will decrease the degree and quality of calcium recovery, as the calcium hydrate will not be completely suspended and an excessive quantity will require greater capacity in thickening apparatus.

Upon submergence, the rock, if properly calcined, begins to disintegrate immediately and even if not agitated, disintegration is usually complete within one to three minutes, due to quenching and the conversion of calcium oxide to calcium hydrate.

The argillaceous limestones, to be treated in accordance with the present process, contain fine quartz and other combinable silicas, and accordingly calcination if not carried out in the manner to be described hereinafter, will result in premature reactions, especially between the calcium and silica to form natural or Rosendale compounds, such as di-calcium silicate, and to some extent alumina compounds are formed. The hydraulic nature of these compounds, resulting from a greater degree of calcination than desired, partially or wholly prevents disintegration when the rock is submerged. In some cases these reactions are so complete, due to excessive heat treatment, that the rock will not disintegrate, and it will be realized that the degree of separation is limited by the extent of these reactions. As these compounds are eliminated from the mixture as waste, it will be seen that controlled calcination is essential in the economical employment of the process.

Extremely fine products of the crusher are especially difficult to calcine without involving the reactions described, and accordingly the crusher should be arranged to deliver a product of substantially uniform size or the various sizes should be screened and graded to be calcined separately. If the crusher delivers too large a quantity of fine products to be discarded as waste, and it is impractical with the calcining equipment available to limit their degree of heat treatment, they may be pulverized in a raw state separately and reduced to sizes suitable for burning and ultimately blended with the treated products as described more in detail hereinafter.

I prefer to submerge the calcined stone in a wash mill or its equivalent whereby it may be stirred for a short interval to accelerate disintegration and the suspension of all of the particles by stirring the batch for a brief interval. After stirring, the coarse quartz particles settle almost immediately, and the argillaceous compounds very quickly thereafter, usually within about 45 seconds.

As soon as the liquid appears white, indicating that the quartz and argillaceous compounds have settled, the milk of lime is decanted or drawn off to a thickener, from which it is ultimately delivered to slurry storage or correction tanks. When it is desired to have the lime compounds in greater density the underflow of the thickener may be passed through conventional slurry filters. It will be realized that the degree of purity is increased by lengthening the interval of settling in the wash mill, but that for present purposes it is ordinarily preferable to make the separation rapidly, as the fine particles of the constituents other than calcium are desired for the ultimate mixture. Thus, a calcium oxide value in the neighborhood of 85% is to be preferred.

Water is added in sufficient quantity to the residue remaining in the wash mill to permit classification in a manner to be described more in detail hereinafter. The coarse silicas and excessive quantities of other constituents of the original rock are discarded and the remaining fines are blended with the milk of lime either before or after thickening. The analyses of the primary and secondary recoveries, and accordingly the quantities of undesirable matter discarded, are controlled by varying the degree of classification, as by varying the interval of settling or the degree of agitation.

If the quantity of uncombinable or excessive silica present in the rock is not large, and the original composition is substantially uniform, the batch delivered to the wash mill may be stirred and decanted immediately after the coarse silicas are deposited, and both the calcium and other desired constituents may be drawn off at the same time. This product may then be thickened to normal slurry moisture content, and delivered to slurry blending tanks, where it may ultimately be combined with other products in the proper proportions. However, in view of the wide variation in the composition of the rock as quarried, and the uncertainty as to the relative quantity of uncombinable silicas present from time to time, and to avoid excessive care and expense in selecting and blending the rock prior to calcination, I prefer to treat the rock as it is received and regardless of its exact analysis, to segregate the unfavorable and usable constituents. The usable constituents are preferably delivered to separate slurry correction tanks in accordance with their analysis and ultimately combined by proportioning and blending in a manner similar to that practiced in wet process cement mills in blending raw material components and correctives.

Calcination and submergence in an excess of water makes possible the separation of the principal constituents of the rock. In the natural rock the particles are cemented or physically bonded together rather than chemically combined. By ordinary methods of pulverization, the reduced particles do not vary sufficiently in size to permit segregation of the various compounds by classification. Calcination, however, at least partially releases the physical bond between all particles due to the loss of carbon dioxide in the conversion of calcium carbonate to calcium oxide. Upon hydration the calcium is released as calcium hydrate in impalpable particle sizes, which are readily suspended in water. The silica compounds are not substantially changed in size and accordingly settle out of suspension quickly, due to their relatively much coarser sizes. Although a part at least of the crystalline silica or quartz particles have become amorphous due to the temperature of calcination, the particle sizes are nevertheless relatively coarse as compared to the calcium hydrate. The silicates of alumina are not substantially changed, and although they range from impalpable powder frequently to readily visible flakes of mica, the quantity of coarse particles present makes it possible to control the alumina content within the desired limits. In some of the argillaceous limestones with which I have experimented, such as the sample referred to hereinafter, the iron compounds are naturally fine, which evidently accounts for the fact that they remain in suspension longer than any of the other compounds except calcium hydrate.

Possibly the reduction in the magnesia content and to some extent the separation of the other compounds is due to relative difference in specific gravity, calcium hydrate having the lowest specific gravity of any of the constituents and that of magnesium hydrate greater than amorphous silica, but less than quartz. The specific gravity of the alumina compounds cannot be stated with accuracy, but most of them are substantially equivalent to crystalline silica. The shape of these particles, particularly the micas, makes their rate of settling difficult to predict.

For a better understanding of the invention, reference is made to the accompanying drawings, in which incidental and alternative steps are indicated by dotted lines, Fig. 1 is a preferred flow diagram of the new method, Fig. 2 is a slightly modified form, which may be used where the variation in rock composition requires extreme flexibility in blending, and Fig. 3 is a modified form which may be practiced when it is not desired to calcine the fine products of the crusher.

As an example of an argillaceous limestone, which may be advantageously treated in accordance with each of the flow diagrams above mentioned, a cement rock quarried at Evansville, Pennsylvania, will be referred to specifically. This rock was selected as an example because all of the constituents, with the exception of a part of the quartz, are exceptionally fine, the argillaceous compounds occurring in paper-thin laminations between laminations of impure calcium carbonate. The specimen serves to illustrate the extreme separation that can be made, under the most difficult conditions, to eliminate not only the coarse quartz but any desired quantity of fine siliceous compounds. It is so excessive in total silica and deficient in calcium carbonate that it may be considered as unusable for practical purposes by methods known heretofore. Further, the addition of calcium carbonate as a corrective would not reduce the alumina content sufficiently to produce a low alumina cement.

The iron content is satisfactory and the magnesia is within permissible limits, but it is obviously desirable to remove as much of this adulterant as possible. The sample serves to illustrate by example the application of the method to rock of various types and the extreme changes in composition that can be accomplished by the new method, but it is to be understood that better grades of rock would ordinarily be treated to avoid excessive waste quantities.

The analyses of this rock both in the raw state and after calcination are given below in order that the composition may be compared with a cement analysis and to indicate more clearly the separation obtained by the new method:

*Original material*

| Raw | | Calcined |
|---|---|---|
| 24.30% | $SiO_2$ | 34.59% |
| 1.40% | $Fe_2O_3$ | 1.99% |
| 5.62% | $Al_2O_3$ | 8.00% |
| 34.96% | $CaO$ | 49.76% |
| 62.43% | $CaCO_3$ | ------ |
| 2.63% | $MgO$ | 3.74% |
| 29.75% | loss | ------ |

This rock is first reduced to secondary crusher sizes, preferably half to three-quarter inch ring, the crusher being so arranged that the product will be as nearly uniform as possible, so that the degree of calcination will likewise be uniform. If there is wide variation in the particle sizes discharged from the crusher, I prefer to grade the material as by screening, and to calcine each size separately to avoid excessive heat treatment of the finer particles or incomplete ignition loss in the larger. The various sizes may be separately calcined in one or more kilns alternately or a plurality of kilns may be employed.

To calcine the rock, rotary kilns are preferred, in order that the degree of heat treatment both by reference to temperature and time can be controlled exactly. This rock at three-quarter inch ring size, when calcined at a temperature of 1800 degrees for approximately 1 hour and 50 minutes disintegrated within three minutes even without agitation after submergence in ten volumes of water, with relatively little loss due to reaction, as will be described more in detail hereinafter.

My experiments have shown that the best results can be obtained by preliminary treatment of available rock specimens of varying composition and particle sizes in the laboratory in order to arrive at the most effective heat treatment to avoid loss and to obtain a maximum of disintegration. This procedure will be described hereinafter.

The rock as discharged from the calciner or calciners is preferably cooled only to a degree sufficient to permit satisfactory mechanical handling. If a cooler is used, any conventional type, such as a rotary clinker cooler, may be employed, but the temperature should not be reduced to a point at which air slaking may result in lime and lime silica reactions which will reduce the total recovery. In order that calcination and cooling can be carried out continuously, I prefer to deliver the material alternately to at least two batch hoppers, so that the calcined material can be delivered to one while that discharged from the other being preliminary processed in a manner about to be described. The batch hoppers offer a convenient means to control the quantity of material with relation to the quantity of water in which it is submerged and the hoppers are therefore so arranged that they deliver alternately or directly to either of two wash mills.

Each wash mill, or its equivalent, should have sufficient capacity to receive one batch and about 10 to 15 volumes of water by reference to the volume of material. Immediately upon submergence in the wash mill, the rock is violently disintegrated, due to quenching and expansion in the conversion of the calcium oxide to calcium hydrate. Each lump rapidly expands and breaks down to fine sizes. As the hot rock disintegrates rapidly, the powder which forms almost instantly on the outer surfaces of the batch prevents immediate complete wetting of buried lumps. Disintegration is, therefore, accelerated by the effect of the wash mill in turning over or stirring the batch in the presence of an excess of water, and this likewise limits the degree of partial reaction between lime and silica compounds.

The operation of the wash mill to accelerate the disintegration is carried out only for a short interval, for ordinarily the mass is completely disintegrated and suspended within one to three minutes. Immediately thereafter, the wash mill is stopped to permit precipitation of the argillaceous compounds. The coarse silicas, together with the small quantity of coarse particles of other compounds which may be present due to premature reaction, or any natural forms not modified by calcination, settle almost instantly. Most of the clay compounds settle within 45 seconds. As soon as the liquid appears white, indicating that the suspended matter is relatively high in calcium hydrate, substantially all of this liquid is drawn off and delivered to a thickener, in which the water in excess of a normal slurry mixture is separated. This water is preferably stored and used in circulation in the process for purposes of economy and likewise to avoid continuing losses due to solubility of the small quantity of calcium hydroxide that will go into solution, sufficient additional water being added from time to time merely to make up losses due to evaporation and combination with the calcium oxide to form calcium hydrate.

The length of the interval in which the clay compounds are allowed to settle in the wash mill determines the degree of purity of calcium hydrate separated and recovered as described above, but it is to be realized that as the ultimate mixture requires four essential constituents and preferably of the finest sizes, long periods of settling are undesirable and the degree of purity of the de-hydrated product would normally not necessarily exceed approximately 85% calcium oxide.

With reference to the rock specimen discussed, a settling interval of 45 seconds resulted in a recovery of fine particles having the following analysis:

|  | Per cent |
|---|---|
| $SiO_2$ | 4.80 |
| $Fe_2O_3$ | 1.48 |
| $Al_2O_3$ | 2.70 |
| $CaO$ | 85.80 |
| $MgO$ | 2.70 |

By reference to the analysis of the original calcined stone, it will be seen that an extreme separation has been made between the calcium, silica and alumina compounds, and it will also appear that the iron which is desirable to replace part of the alumina has not been lost in similar degree, owing to its naturally fine state of subdivision, and the release of these particles caused by the hydration and disintegration of the calcined lumps. It is also to be noted that the magnesia has been reduced approximately 1%. My experiments have indicated that magnesia separation varies with different classes of original stone, but that in some cases the separation at this point may be as much as half of the original quantity. In the above and following analyses, the percentages are based upon the calcium oxide instead of calcium hydroxide values; that is, the "dead burned" analyses of the products, to avoid misunderstanding.

The remaining quantities of the essential constituents remaining in the residue in the wash mill may be separated and recovered in several ways. I prefer, for reasons of flexibility in control, as well as to obtain greater operating capacity from the equipment available, to add sufficient water to the residue whereby it may be pumped from the wash mill and classified in accordance with particle sizes. For this purpose I prefer to use a classifier of the combined bowl and rake type, in which the separation can be made continuously. By varying the degree of agitation in the bowl classifier and rake box, and particularly the degree of settling permitted in the latter, the separation in accordance with particle sizes permits a wide latitude in the control of analysis. The rake discharge includes all of the coarse particles, particularly the coarse quartz. If the degree of silica and alumina elimination is not sufficiently complete, by eliminating only the coarse sands the degree of separation may be increased by increasing the quantity of water with or without decreasing the agitation, whereby more of the coarser particles of these compounds which settle more slowly than the sands are permitted to precipitate. The simplest expedient to increase the rate or the quantity of particles precipitated is to increase the proportion of water with respect to total solids; in other words, to employ a thinner mixture. Substantially the same results can be obtained, but with some danger of wasting desirable quantities, by siphoning or pumping some of the suspended matter from the rake box at varying distances above the rake elements. This permits rapid removal of some of the solids which failed to precipitate rapidly enough to obtain the desired rake discharge.

As an alternative to recover the desirable compounds from the wash mill residue, ten to fifteen volumes of water may be added to the residue therein, and the mixture again stirred and allowed to settle for a sufficient interval to permit the precipitation of the undesirable compounds, the interval being normally approximately 45 seconds, but readily determined with any rock residue by analyzing samples obtained at different settling periods. When the desired degree of settling has been obtained, substantially all of the liquid with the suspended solids is drawn off.

These products so recovered, or the same products as recovered from the bowl and rake classifier may then be delivered to the thickener, and as the process is continuous, the underflow can be controlled within the desired proportions and ratios.

By further reference to the rock specimen discussed, the combination of the two quantities of material recovered and mixed were of the following analysis:

| | Per cent |
|---|---|
| $SiO_2$ | 22.98 |
| $Fe_2O_3$ | 1.64 |
| $Al_2O_3$ | 6.26 |
| CaO | 64.77 |
| MgO | 2.80 |

It will be seen that this analysis, when corrected for coal ash and gypsum, will result in a Portland cement of high quality and in which the four essential constituents are properly corrected. It will also be seen that the magnesia is approximately 1% less than in the original calcined material.

The total quantity of recovered matter is approximately 80% of the total rock. The remaining 20%, which constitutes the unusable sands or coarse particles, had the following analysis:

| | Per cent |
|---|---|
| $SiO_2$ | 72.01 |
| *$R_2O_3$ | 12.50 |
| CaO | 10.20 |
| MgO | 5.51 |

* Combined iron and alumina.

The high degree of silica elimination is particularly of interest to cement chemists, in that these sands include all of the uncombinable quartz. Attention is also directed to the total quantity of magnesia eliminated. The calcium values discarded are probably due to incomplete release of the physical bond between it and the other compounds, particularly silica, resulting from incomplete ignition loss, partial reaction or both. This loss is inconsiderable, however, in view of the fact that the reduction of particle sizes has been carried out at considerably less expense than by conventional grinding methods, and is likewise more than offset by the increase in strength characteristics of the finished cement, resulting from the complete reaction of the constituents. Saving the cost of importing limestone as a partial corrective is, of course, the greatest economy where the available material could have been used in its natural state as the principal component of the mixture. The resulting product likewise has the advantage of more economical and complete kiln reactions, not only due to the fineness of particle sizes and ther intimate contact, but also to the preliminary ignition loss. Accordingly, in the clinkering kiln, it is only necessary to drive off the water and bring the mixture up to clinkering temperature, and it follows that greater kiln capacity in clinker can be had as compared with conventional methods.

In order further to illustrate the flexibility in control of analysis that may be had even with a rock of such extremely poor quality as that cited by way of example, the residue precipitated after the first stirring when again stirred in ten volumes of water and allowed to settle for a period of one minute provided an overflow of the following analysis:

| | |
|---|---|
| $SiO_2$ | 22.80 |
| $Fe_2O_3$ | 1.78 |
| $Al_2O_3$ | 4.28 |
| CaO | 63.70 |
| MgO | 2.99 |

It will be seen that the analysis above given is only slightly below a normal Portland cement mixture in calcium value. The iron recovery is even more favorable and there has also been a loss in magnesia. It will thus be seen that by varying the degree of classification, by varying the time of settling or otherwise, the analysis of the primary and secondary recoveries can be controlled to arrive at almost any desired ultimate analysis, or analysis of any intermediate recovery.

If the rock delivered to the calciners is fairly uniform in composition over a period of time, the composition as withdrawn from the thickener can be controlled within the desired limits of the mixture to be burned. However, in order that excessive care in analysis and control may be avoided, and cements of various compositions produced alternately without delay, I prefer to effect the final mixture as shown in Fig. 2. The white, supernatant liquid resulting from the first stirring and settling in the wash mills is drawn off and delivered to a thickener reserved for these high calcium values.

From this thickener, the suspended solids, dewatered to normal slurry moisture content, are delivered to one or more storage or blending tanks. The usable fine constituents resulting from the second separation, as by the classification apparatus, are delivered to a second thickener, from which the de-watered solids are pumped to other blending tanks. As normal routine analysis will indicate the approximate composition of the second recovery, recoveries made at different times may be separately stored in blending tanks, particularly in accordance with the calcium value. This permits the chemist to withdraw and proportion the necessary quantities of the first and second recoveries made at different times to effect a final mixture of the desired ultimate analysis, the final mixture and blending being accomplished in a manner similar to the ordinary wet blending of cement raw material mixtures.

Thus, with the exception of the care necessary to obtain the proper degree of calcination, the rock may be treated, regardless of variation in composition, just as it comes from the quarry, to effect the removal particularly of uncombinable quartz and excesses of one or more constituents, and without the careful control necessary to effect the mixture in a single thickener.

In normal operation, and during one interval of operation, the rock as quarried may be only slightly excessive in one or more constituents, but during succeeding intervals more extreme variation from the desired analysis may be expected and it will be apparent that by controlling the settling and classification apparatus for the primary purpose of removing uncombinables, waste of usable quantities of certain constituents recovered from low grade rock can be avoided by storing them and later combining them with recoveries made from higher grade argillaceous limestones, or recoveries of higher grade derived from the same or other low grade rock.

Very frequently the raw materials available to a manufacturer comprise at least two groups, one of which is below a mix with respect to calcium carbonate, and the other above. Although it will appear that under most conditions the low and high stones could be combined in the proper proportions, as components of the final mixture, to correct the lime modulus, either the relative quantities so taken may be entirely disproportionate or the combination may fail entirely to correct the proportions of the other essential constituents and the other ratios, and the total magnesia may exceed permissible limits. It will be evident that mixtures can be produced, by the new method as above described, from either of these high or low stones, but it will be seen that if both are available in quantity, separate treatment to produce a mix may require large slurry storage capacity and difficult blending problems to avoid waste of combinables, such as the excessive combinable silica of the low stone and the excessive calcium carbonate of the high stone.

Under such circumstances, and with materials generally similar to those described hereinafter, it is usually preferable for reasons of economy in available equipment, to treat only the high-grade stone to remove therefrom the major portion of the siliceous material, together with variable quantities of the other clay compounds and foreign materials. These are removed in accordance with the method above described, and the final mixture made up by combination of the recovered fine products with the necessary proportions of the low-grade stone to arrive at a desired ultimate analysis with the least waste of combinable constituents.

As a specific example, high and low-grade stones taken from the same quarry in the Lehigh Valley district serve to illustrate the preferred procedure. For the sake of brevity, the raw analyses of materials will be discussed:

| Low-grade | | High-grade |
|---|---|---|
| 21.56 | $SiO_2$ | 8.40 |
| 2.24 | $Fe_2O_3$ | 1.20 |
| 4.20 | $Al_2O_3$ | 2.40 |
| 38.08 | $CaO$ | 43.68 |
| 68.00 | $CaCO_3$ | 78.00 |
| 1.92 | $MgO$ | 4.78 |
| 4.00 | $MgCO_3$ | 10.00 |

If these materials were combined as components of a mixture on a basis of 3.5 parts of the low limestone to 6.5 parts of the high-grade stone, the mixture would be approximately correct with respect to all of the essential constituents, but the magnesia content would be above permissible limits, and therefore the mixture could not be used. The analyses of such a mixture and the resulting cement (not corrected for coal ash or gypsum) would be as follows:

| Mixture | | Cement |
|---|---|---|
| 13.00 | $SiO_2$ | 20.60 |
| 1.56 | $Fe_2O_3$ | 2.48 |
| 3.04 | $Al_2O_3$ | 4.82 |
| 41.72 | $CaO$ | 66.10 |
| 74.50 | $CaCO_3$ | ---- |
| 3.78 | $MgO$ | 6.00 |
| 7.90 | $MgCO_3$ | ---- |

Although the silica content of the low-grade stone is excessive, the quantity of uncombinable silica is so inconsiderable that correction to remove it is unnecessary. This stone, when pulverized to the usual degree of fineness can be used as a component of the ultimate mixture. It is preferable to treat only the high-grade stone by calcination, submergence and separation, as above described. This separation may easily be carried to a degree which will remove all but a small quantity of the silica. The recovered product had the following analysis:

| | |
|---|---|
| $SiO_2$ | 2.50 |
| $Fe_2O_3$ | .98 |
| $Al_2O_3$ | 1.76 |
| $CaO$ | 49.03 |
| $CaCO_3$ | 87.56 |
| $MgO$ | 3.44 |
| $MgCO_3$ | 7.20 |

It is to be especially noted that in addition to the wide separation of all clay compounds, there has been a reduction of nearly 3% in magnesia. Although the degree of magnesia elimination is not as great in this specimen as in some others, it serves to illustrate how the treatment of the specimen makes it suitable for use. By discarding all but a small percentage of the argillaceous compounds, the total quantity of recovered product necessary to produce the ultimate mixture will be only 1.1 parts to 1.9 parts of the untreated low-grade stone. As a result, the total magnesia will be well within permissible limits and the analysis of the mixture and the cement produced therefrom (not corrected for coal ash or gypsum) will be as follows:

| Mixture | | Cement |
|---|---|---|
| 14.57 | $SiO_2$ | 22.68 |
| 1.78 | $Fe_2O_3$ | 2.77 |
| 3.39 | $Al_2O_3$ | 5.10 |
| 42.10 | $CaO$ | 65.54 |
| 75.17 | $CaCO_3$ | ----- |
| 2.48 | $MgO$ | 3.86 |
| 5.18 | $MgCO_3$ | ----- |

In neither of the original components was the alumina high, but as the reduction in the quantity present in the recovered product will make obvious, if the high-grade stone had been excessive in alumina, control of the total analysis of the recovered product together with the relative proportion used in combination with the other component would enable the chemist to correct the final mixture. Thus, the above example is intended to show that many of the advantages of the new method can be realized in controlling a final analysis as to all constituents merely by treating one component of the mixture. It will be understood that, in general, greater economy in reducing the stone and burning the mixture to clinker will be obtained if all the stone is treated, and that the finished cement is likely to be of greater strength and more nearly uniform.

It will now be seen that the chemist can produce an ultimate mixture from such materials corrected as to both proportions and ratios and employ only the materials available to him, without going to the expense of importing correctives which may not achieve the desired result, in view of his inability, with natural correctives, to control the proportions and ratios of all constituents, and it is to be noted that the above procedure is economical in the use of the high-grade stone.

Although I have referred to two recovered products resulting from the first settling and overflow from the wash mill, and the second recovery obtained from the residue, it will be realized that after the first recovery is made, more than one recovery can be made therefrom by repeating the suspension or other classification of the residue and drawing off the supernatant liquid after different periods of settling or degrees of classification. However, this repetition in the treatment of the residue is unnecessary, particularly when the second recovery from rocks of similar composition is separately stored and proportioned as above described.

As described before, fine products discharged from the secondary crusher are especially difficult to calcine to the exact degree necessary to cause disintegration and suspension of the calcium values, as calcium hydrate, and that unless extreme care is exercised much of the calcium may be lost either due to incomplete ignition loss and failure to break the physical bond between the calcium and silica compounds, or Rosendale or natural cement reactions resulting from overburning and hydration.

In either case the compounds are in relatively coarse form and settle quickly in the classification apparatus and are discarded by the rake or other means employed to remove the sands. Where the nature of the equipment available makes it impossible to control calcination properly, I prefer to treat the material as indicated in Fig. 3. The fines segregated by screening or other conventional methods are ground in their natural raw state in a conventional pulverizer, such as a tube mill, to normal cement raw material fineness, in the presence of water to form a slurry. This slurry is likewise delivered to a separate blending tank, from which it may be proportioned with the products recovered from the calcined coarse particles or lumps.

Although I have referred to the use of two wash mills, which may be used alternately to provide for continuous operation, it will be understood that any device capable of stirring the batches may be used. Grinding in the normal sense is not required, and accordingly hydroseparators or bowl classifiers may be substituted for wash mills, provided the rake or equivalent apparatus is made sufficiently strong to stir the coarse lumps discharged from the batch hoppers. It will likewise be understood that if the composition of the rock to be treated requires only a limited correction, especially by elimination of silica, only one separation need be made and that from the wash mill or its equivalent, the suspended matter may be decanted immediately after the coarse particles have precipitated.

Although relatively little iron is discarded with the waste products, it will be obvious that in some rocks a part of the iron will be in a relatively coarse form and will be precipitated with the quartz and other siliceous compounds. Accordingly, the sands discarded by the classification apparatus may be passed over a wet concentration table and separation effected between the iron and other constituents. The iron so separated, together with any desirable quantities of the remaining constituents are preferably ground by conventional methods and used in the necessary quantity to correct the proportions. Likewise, if the available material is deficient, especially in iron, to a degree that only partial correction can be effected, the new method is of great commercial importance in effecting the partial correction, and the ultimate mixture can be brought to the desired composition without difficulty by adding a relatively small quantity of this constituent, obtained from an outside source.

It will be seen from the foregoing description that by the new method, mixtures can be obtained solely, if desired, from an available inferior material, and that undesirable quantities and forms of certain constituents, together with quantities of foreign materials can be eliminated and that materials can be employed in the manufacture of cement which cannot be completely corrected by methods known heretofore, excepting that described in my patent referred to above.

As referred to before, the degree of calcination which will produce the most complete disintegration and recovery from any rock can readily be determined in the laboratory. It is to be borne in mind that the temperature and interval of heating will depend upon the composition of the rock with especial reference to the fine silicas present and especially those made active at the temperature of liberation of the carbon dioxide. As at least a part of the silica will be activated at temperatures below the ignition point of calcium carbonate, the interval and temperature should both be controlled to the minimum necessary to obtain the disintegration above described. Likewise, as the rate of calcination is influenced by the size of particles or lumps, the samples to be treated should be graded whereby they may be calcined separately. Calcination may be carried out experimentally in a laboratory electric furnace at temperatures ranging slightly above the ignition temperature of calcium carbonate and ranging approximately from 1600 to 2000 degrees Fahrenheit. Each size should be heated for various intervals ordinarily not exceeding three hours for normal secondary crusher sizes. The calcined stone, preferably while still hot, to avoid air slaking and consequent combination of a part of the calcium and silica, should be submerged in a beaker, for instance, in approximately ten to fifteen volumes of water. If properly calcined, the sample will tend to disintegrate almost instantly, and all particles can be suspended by stirring briefly.

The liquid is allowed to settle for a sufficient length of time until it appears as a white milk of lime, which should take place within approximately forty-five seconds. This liquid is drawn off and reserved for analysis. Water is again added and the residue stirred and allowed to settle until the sands or coarse particles have precipitated. The liquid is then decanted and both products reserved for analysis. As will now be obvious, the preferable degree of calcination will be apparent from the sample, the final coarse residue of which is of lowest calcium value.

I claim:

1. The method of preparing a cement raw material mixture of a desired ultimate analysis from inferior argillaceous limestones, containing undesirable quantities of at least one constituent, which comprises reducing the stone to sizes suitable for calcining, calcining the stone only to a degree sufficient to liberate substantially all of the carbon dioxide, but short of a degree sufficient to cause material calcium and silica reactions, particularly during hydration in an excess of water, submerging the stone in a quantity of water sufficient to hydrate the calcium oxide and to suspend substantially all of the calcium hydrate, agitating the submerged stone to suspend the fine particles of all constituents, allowing the coarse particles to precipitate, drawing off the suspended fine particles and discarding the coarse particles.

2. The method of preparing a cement raw material mixture of a desired ultimate analysis from inferior argillaceous limestones, containing the constituents calcium carbonate, silica, alumina and iron, at least one of which occurs in excessive quantity, which comprises reducing the stone to a size suitable for calcining, calcining the stone only to a degree sufficient to liberate substantially all the carbon dioxide, but short of a degree sufficient to cause material calcium and silica reactions, particularly during hydration in an excess of water submerging the calcined stone in an excessive quantity of water sufficient to disintegrate the stone by hydration, and to permit suspension of the fine particles, agitating the submerged stone to suspend the particles, separating the fine from the coarse particles and discarding the coarse particles.

3. The method of preparing a cement raw material mixture of a desired ultimate analysis from inferior argillaceous limestones, containing the constituents calcium carbonate, silica, alumina and iron, at least one of which occurs in excessive quantity, which comprises reducing the stone to a size suitable for calcining, calcining the stone only to a degree sufficient to liberate substantially all the carbon dioxide, but short of a degree sufficient to cause materal calcium and silica reactions, particularly during hydration in an excess of water, submerging the calcined stone in an excessive quantity of water sufficient to disintegrate the stone by hydration, and to permit suspension of the fine particles, agitating the submerged stone to suspend the particles, permitting the particles to settle to precipitate the clay compounds, drawing off the suspended calcium hydrate, adding additional water to the residue and segregating the fine from the coarse particles, discarding the coarse particles, and combining the fine particles with the calcium hydrate.

4. The method of preparing a cement raw material mixture of a predetermined analysis from inferior argillaceous limestones, in which at least one of the constituents, silica and alumina, occurs in excessive quantity, which comprises reducing the stone to sizes suitable for calcining, calcining the stone only to a degree sufficient to liberate the carbon dioxide, but short of a degree sufficient to cause material calcium and silica reactions, particularly during hydration in an excess of water, submerging the stone in an excess of water sufficient to hydrate the calcium oxide and suspend the calcium hydrate, agitating the stone to accelerate suspension of all fine particles, separating the fine particles of all constituents from the coarse and discarding the coarse particles to eliminate the said excessive quantity.

5. The method of preparing a cement raw material mixture of desired ultimate analysis from inferior argillaceous limestones, containing the constituents silica and alumina, at least one of which is present in excessive quantity, which comprises crushing the stone to a size suitable for calcining, calcining the stone only to a degree sufficient to liberate substantially all of the carbon dioxide, but insufficient to produce material reactions between the calcium and silica in the presence of water, submerging the calcined stone in an excess of water sufficient to hydrate the calcium oxide and to suspend the calcium hydrate, agitating the submerged stone to suspend the particles, allowing the clay compounds to precipitate, drawing off substantially all of the water to recover the suspended calcium hydrate, adding an additional quantity of water to the residue in quantity sufficient to suspend the fine particles thereof, agitating the submerged residue, classifying to recover the fine particles, and discarding the coarse particles to eliminate the said excessive quantity.

6. The method of preparing a cement raw material mixture of desired ultimate analysis from inferior argillaceous limestones, containing the constituents silica and alumina, at least one of which is present in excessive quantity, which comprises crushing the stone to a size suitable for calcining, calcining the stone to a degree sufficient to liberate substantially all of the carbon dioxide, but insufficient to produce material reactions between the calcium and silica in the presence of water, submerging the calcined stone in an excess of water sufficient to hydrate the calcium oxide and to suspend the calcium hydrate, agitating the submerged stone to suspend the particles, allowing the clay compounds to precipitate, drawing off substantially all of the water to recover the suspended calcium hydrate, adding an additional quantity of water to the residue in quantity sufficient to suspend the fine particles thereof, agitating the submerged residue, classifying the residue to recover the fines, combining the fines with the previously recovered calcium hydrate, and discarding the coarse particles to eliminate the said excessive quantity.

7. The method of preparing a cement raw material mixture of desired ultimate analysis from inferior argillaceous limestones, containing the constituents silica and alumina, at least one of which is present in excessive quantity, which comprises crushing the stone to a size suitable for calcining, calcining the stone only to a degree sufficient to liberate substantially all of the carbon dioxide, but insufficient to produce material reactions between the calcium and silica in the presence of water, submerging the calcined stone in an excess of water sufficient to hydrate the calcium oxide and to suspend the calcium hydrate, agitating the submerged stone to suspend the particles, allowing the clay compounds to precipitate, drawing aff substantially all of the water to recover the suspended calcium hydrate, adding an additional quantity of water to the residue in quantity sufficient to suspend the fine particles thereof, agitating the submerged residue, classifying the residue according to size to separate the coarsest particles to eliminate the excessive quantity of said constituent, and varying the degree of classification to control the quantity so eliminated.

8. The method of preparing a cement raw material mixture of a desired predetermined analysis from inferior argillaceous limestones in which at least some of the silica occurs in a form too coarse for favorable combination in the process of burning to clinker, which comprises reducing the stone to sizes suitable for calcining, calcining the stone only to a degree sufficient to liberate substantially all of the carbon dioxide, but insufficient to produce compounds of calcium and silica in the presence of water, submerging the calcined stone in an excess of water sufficient to disintegrate the stone by quenching and hydration of the calcium oxide and to suspend the fine particles, agitating the submerged stone to accelerate suspension of the fine particles, permitting the coarse silica particles to precipitate and drawing off the suspended fine particles and discarding the precipitated particles.

9. The method of preparing a cement raw material mixture of a desired predetermined analysis from inferior argillaceous limestones in which at least one constituent occurs in excessive quantity, which comprises reducing the stone to a size suitable for calcining, calcining the stone only to a degree sufficient to liberate substantially all of the carbon dioxide, but insufficient to cause material reaction between calcium and silica in the presence of water, submerging the calcined stone in an excess of water sufficient in quantity to hydrate the calcium oxide and to suspend the fine particles of calcium hydrate, agitating the submerged stone to suspend the particles, allowing the coarse particles and the clay compounds to settle, drawing off the water to recover the calcium hydrate, de-watering the latter to normal slurry water content, adding water to the residue, agitating the residue to suspend the fine particles, separating the same from the coarse particles, de-watering these fine particles, combining them with the calcium hydrate in the desired proportion and discarding the coarse particles to eliminate the excessive quantity.

10. The method of preparing a cement raw material mixture of a desired predetermined analysis from inferior argillaceous limestones in which at least one constituent occurs in excessive quantity, which comprises reducing the stone to a size suitable for calcining, calcining the stone only to a degree sufficient to liberate substantially all of the carbon dioxide, but insufficient to cause material reaction between calcium and silica in the presence of water, submerging the calcined stone in an excess of water sufficient in quantity to hydrate the calcium oxide and to suspend the fine particles of calcium hydrate, agitating the submerged stone to suspend the particles, allowing the coarse particles and the clay compounds to settle, drawing off the water to recover the calcium hydrate, de-watering the latter to normal slurry water content, adding water to the residue, agitating and classifying the residue according to size to separate the coarser particles, discarding the coarse particles and controlling the quantity discarded of the constituent occurring in excess, by controlling the degree of classification, de-watering the fine particles and combining them with the calcium hydrate in the desired proportions to effect the said mixture.

11. The method of preparing a cement raw material mixture of a desired predetermined analysis from inferior argillaceous limestones which vary in analysis from time to time as received for treatment, each of which contains at least one constituent in an excessive quantity which comprises crushing the stone to a size suitable for calcining, calcining the stone only to a degree sufficient to liberate substantially all of the carbon dioxide, but short of a degree sufficient to cause material calcium and silica reactions, particularly during hydration in an excess of water submerging the calcined stone in a sufficient quantity of water to hydrate the calcium oxide and suspend substantially all of the calcium hydrate, agitating the submerged calcined stone to suspend the fine particles of all constituents, permitting the coarse particles to precipitate, drawing off and de-watering the fine particles to normal slurry water content, storing the said slurry in accordance with its calcium value and proportioning and blending this slurry with other slurries similarly prepared, but of different calcium value to prepare an ultimate mixture of the desired calcium value.

12. The method of preparing a cement raw material mixture of a desired predetermined analysis from inferior argillaceous limestones, which comprises treating at least one component of the mixture by crushing the same to a size suitable for calcining, calcining this stone only to a degree sufficient to liberate substantially all of the carbon dioxide, but short of a degree sufficient to cause material calcium and silica reactions, particularly during hydration in an excess of water, submerging the calcined stone in a sufficient quantity of water to hydrate the calcium oxide and suspend substantially all of the calcium hydrate, agitating the calcined stone to suspend the calcium hydrate, separating and discarding a major quantity of the clay compounds from the calcium hydrate, de-watering the latter to substantially normal slurry water content and combining these recovered products with the necessary quantity of the other component to produce the said mixture.

13. The method of preparing a cement raw material mixture of a desired predetermined analysis from inferior argillaceous limestones which vary in analysis from time to time as received for treatment, each of which contains at least one constituent in an excessive quantity, which comprises crushing the stone to a size suitable for calcining, calcining the stone only to a degree sufficient to liberate substantially all of the carbon dioxide, but short of a degree sufficient to cause material calcium and silica reactions, particularly during hydration in an excess of water, submerging the calcined stone in a sufficient quantity of water to hydrate the calcium oxide and suspend substantially all of the calcium hydrate, agitating the submerged calcined stone to suspend the fine particles of all constituents, permitting the coarse particles to precipitate to segregate the particles too coarse for favorable combination in the process of burning to clinker, drawing off the fine particles of all constituents, de-watering them to normal slurry moisture content, storing them in accordance with their calcium value and proportioning and blending the slurries so produced by combining quantities of calcium value below that desired for the mixture with quantities of greater calcium value to produce a final mixture of the desired calcium value.

14. The method of preparing a cement raw material mixture of predetermined analysis from inferior argillaceous limestones containing at least one of the constituents silica and alumina in excessive quantity, which comprises crushing the stone to sizes suitable for calcining, classifying the reduced stone in accordance with sizes, separately calcining each size and controlling the degree of calcination to liberate substantially all of the carbon dioxide, but insufficient to cause material reaction in the presence of water, submerging the calcined stone in an excess of water sufficient to hydrate the calcium oxide, and to suspend the fine particles, agitating the submerged stone to accelerate suspension of the fine particles, classifying the particles according to size, discarding a sufficient quantity of the coarsest particles to eliminate the excessive quantity of said constituent.

15. The method of treating inferior argillaceous limestones to produce a cement raw material mixture of a desired predetermined analysis, and to reduce the stone to particle sizes suitable for burning to cement clinker, which comprises crushing the stone to a size suitable for calcination, calcining the stone only to a degree sufficient to liberate substantially all of the carbon dioxide, but insufficient to cause material reactions between calcium and silica in the presence of water, submerging the calcined stone in a quantity of water sufficient to cause disintegration by quenching and hydration of the calcium oxide and suspension of the fine particles, agitating the submerged stone to accelerate suspension, separating the fine from the coarse particles, and discarding the latter.

16. The method of preparing a cement raw material mixture of a desired predetermined analysis from inferior argillaceous limestones, which comprises reducing the stone to particle sizes suitable for calcining, classifying the stone according to sizes, reducing the fine particles in a raw state in the presence of water to normal slurry fineness, storing the said slurry in a blending tank, separately calcining the remaining stone according to size to a degree sufficient to liberate substantially all of the carbon dioxide, but insufficient to cause material reaction between the calcium and silica in the presence of water, submerging the calcined stone in an excess of water sufficient to hydrate the calcium oxide, and to suspend the fine particles, agitating the submerged stone to accelerate suspension of the fine particles, drawing off the fine particles and de-watering them to normal slurry water content, and proportioning and blending them with the slurry first mentioned to produce a mixture of the desired analysis.

CHARLES H. BREERWOOD.